S. PATENT OFFICE.

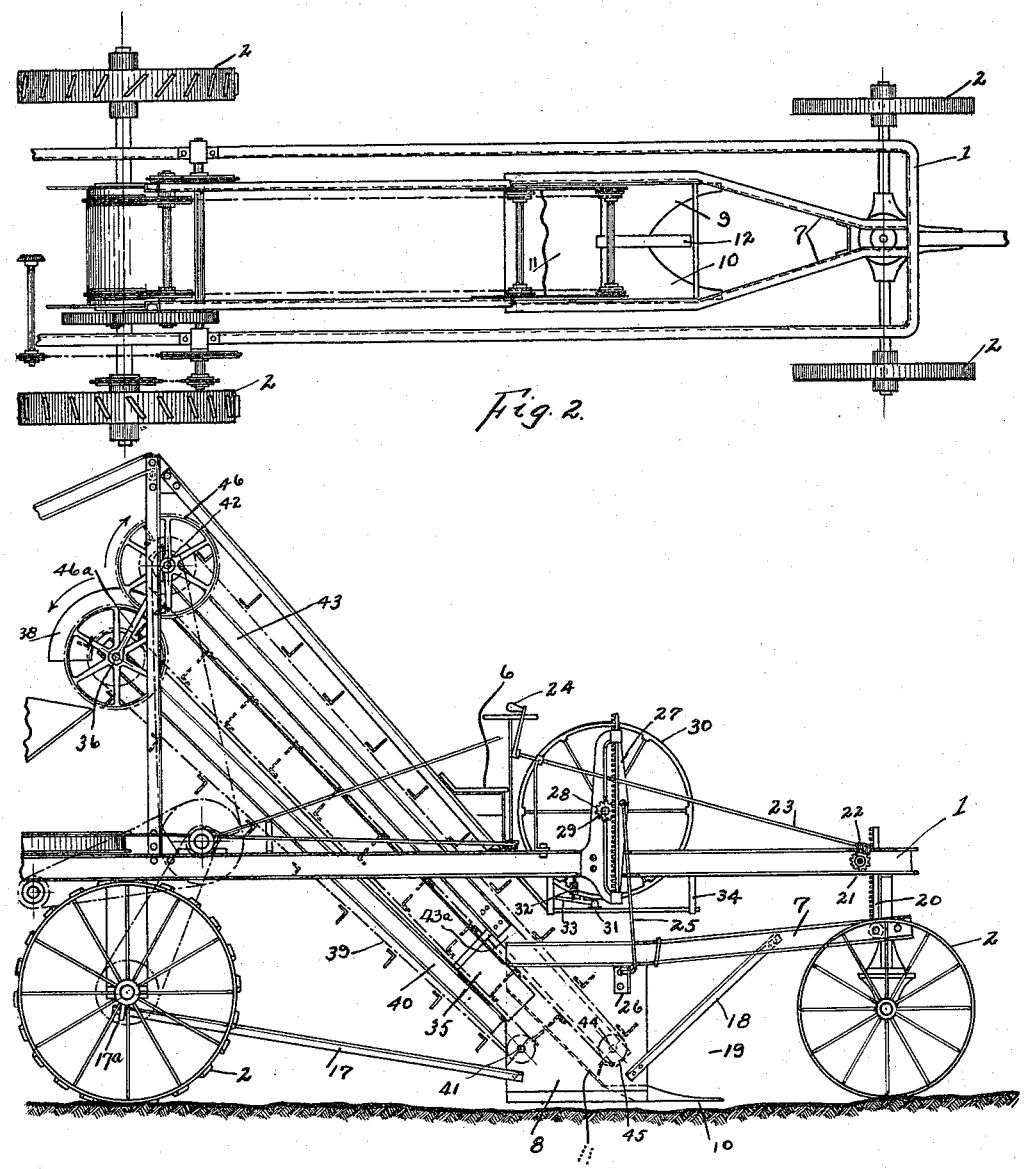

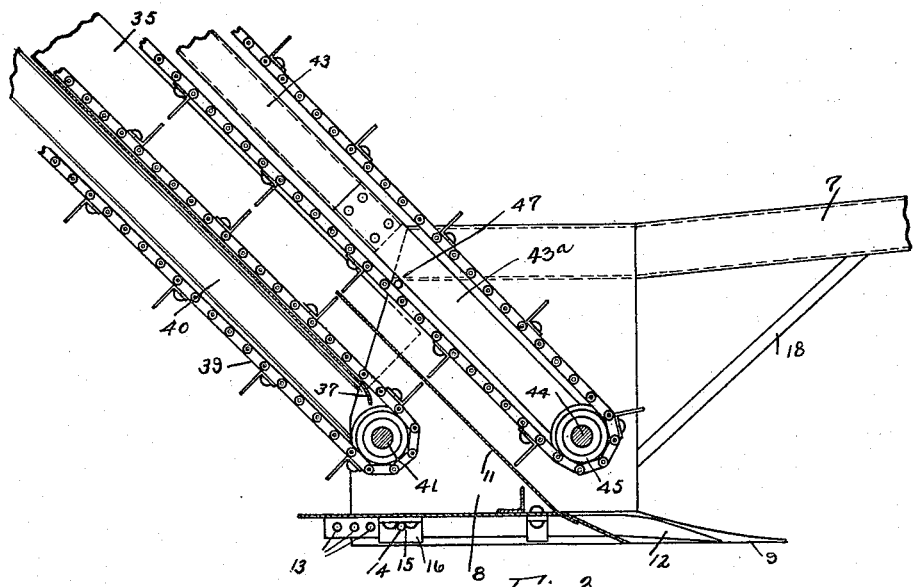

PEARL D. CONVERSE, OF COLUMBUS, OHIO.

EXCAVATING-MACHINE.

1,157,209.  Specification of Letters Patent.  Patented Oct. 19, 1915.

Application filed December 11, 1911. Serial No. 665,181.

*To all whom it may concern:*

Be it known that I, PEARL D. CONVERSE, a citizen of the United States, residing at Columbus, in the county of Franklin and State of Ohio, have invented certain new and useful Improvements in Excavating-Machines, of which the following is a specification.

My invention relates to excavating machines and is particularly designed to provide an improvement in excavating machines of the type employing elevating structure and complemental dumping structure designed to dump the excavated material in any direction.

My invention is believed to be structurally and functionally superior to anything hitherto known because of the provision of special features.

A prime one of these features resides in the provision of elevating structure of a type calculated to and acting to compensate for the inequalities in the material fed thereto by the plow blades.

Difficulties common to machines of this type reside in the inevitability of digging stones or lumps of sod of an excessively large size. It is designed to effectually overcome all danger of breakage from the gathering of such excessively large lumps or stones.

In addition, it is aimed to provide a structure having a means for positively insuring conduction of the plowed material to a point in the elevating operation such that practically all danger of accidental return of the material will be obviated. I desirably accomplish this by the provision of a plate introduced between the plow blades and the true point of effective elevation.

My invention further contemplates the provision of plow blades of such a nature and form that the soil plowed will hardly be turned over, but will be affected as by a scoop. The scooping action is furthermore effected by blades calculated to and effective to confine the plowed material and preclude escape of the material laterally from such blades. In the effectuation of this scooping action, I desirably utilize a rooter point which is adjustably mounted in connection with the plow blades and is capable of longitudinal adjustment to compensate for wear. In addition, I utilize mechanism for adjusting the vertical position of the plow blades and also for adjusting the angle of inclination thereof.

The preferred embodiment of my invention is shown in the accompanying drawings, in which similar characters of reference designate corresponding parts, and in which:

Figure 1 is a side elevation of my assembled machine, Fig. 2 is a plan view of the structure shown in Fig. 1 and Fig. 3 is a detail view showing the lower end of the elevator structure and of the plow blade.

My excavating machine comprises a frame 1, supported in a suitable manner upon wheels 2, the frame itself carrying a seat 6 conveniently located with respect to the adjusting mechanism to be presently described. Mounted upon the forward portion of the frame is a supplemental framework 7 desirably of Y-form and carrying at its open end a casing 8 of a box-like formation. This casing 8 is constructed to removably support twin plow blades 9 and 10 and an upwardly inclined throat plate 11 for a purpose to be hereinafter described. Extending through such throat plate and to a point between the cutting edges of the twin plow blades, is a rooter point 12 which has its opposite terminus provided with a plurality of spaced apertures 13 coacting with a pin 14 extending through registering holes 15 in the channel member 16. It will be understood that the plurality of holes 13 and the pin 14 permit of a ready longitudinal adjustment of the rooter point to compensate for wear necessarily resulting from the normal action of the excavator. The box-like formation 8 is desirably reinforced and stiffened in its position by braces 17 and 18 which prevent the tendency to lateral wabbling, the former being pivotally supported at one end to the box 8 and slidably connected at its other end, as regards rearward movement, to the hanger 17ª, while the latter is rigidly connected at both ends to the frame 7 and box 8. The front end of the Y-frame is supported upon the lower end of a rack 20 which extends into coöperative relation with a pinion shaft driven by a pinion 21, a worm 22 under the control of a rod 23 and handle 24. The rear end of the Y-frame is supported by links 25 connected at their lower ends to flange members 26 and at their upper ends to a rack 27 movable under the control of a pinion 28 mounted upon a shaft 29 rotatable by means of a hand wheel 30. This hand wheel 30 is normally maintained immovable by a friction or other type of brake such as shown at 31. This brake is desirably maintained normally in operative position by a coil spring 32 and is provided with a pedal formation 33. The framework 34 is in the nature of a skeleton framework serving as a foot rest for the operator when he is seated upon the supplemental seat 6.

The elevator structure of my invention desirably comprises a trough 35 secured at its lower end to the box-like framework 8 and having the weight of its upper end ultimately carried by the shaft 36. This trough is desirably slightly curved downwardly at its entrance end as at 37 and has its upper end bent substantially concentric with the periphery of the said supporting shaft as at 38. Carried from the shaft 36 and at its lower end upon the box-like framework 8 is an endless carrier structure 39 which is disposed to travel within the trough 35, moving up the base thereof. This endless carrier may be of any preferred type, but it is desirably of substantially one-half the height of the trough. The conveyer chains and the framework 40 thereof are desirably supported at their lower ends upon a shaft 41 which in turn is permanently and rotatably mounted upon the box-like framework 8. It will therefore be seen that the lower end of this conveyer element has a comparatively permanent support and the character of its support at its upper end will be further explained subsequently in this specification. Complemental to the described conveyer structure is a superposed conveyer element having its upper end permanently supported upon a shaft 42 which shaft rests in bearings of any desired form securely fastened to the head frame. This conveyer structure comprises side frame pieces 43 of channel form pivotally supported upon said shaft and carrying in their lower ends, through the medium of plates 43ª, a second shaft 44 with sprockets 45. The upper sprockets are shown at 46. The two conveyers are driven in any preferred manner from the wheels of the excavating machine, but a detail description of this mechanism is not entered into, for the reason that it is not considered of particular importance in this invention. The essential features of the structure of this upper conveyer resides in the fact that the frame pieces and the conveyer are only permanently supported at their upper ends and this support is pivotal so that the lower ends of the conveyer and frame pieces extend downwardly above the throat plate 11, but are capable of an upward swinging movement upon the pivotal support mentioned. The downward movement of this conveyer is limited by pins 47 carried upon the box-like framework 8. The construction of the upper end of the lower conveyer comprises links 46ª rotatably carrying the head shaft 36 at its lower end and pivotally connected at its upper end to the head shaft 42 of the upper conveyer. From the foregoing description, it will be seen that the upper conveyer has a stationary head shaft support and an oscillatory foot shaft support, swinging about the head shaft as a pivot, while the lower conveyer has a stationary foot support in the box-like structure 8 and a movable head support 46ª, pivotally connected to the head shaft 42 of the upper conveyer and controlled by the vertical movements of the entire box-like structure 8.

In operation of my invention or the parts thereof so far described, the twin plow points and the rooter point serve to scoop a determinate quantity of the dirt or material being excavated. The formation of the twin plow blades is such that there is no lateral escape of any material portion of the dirt or material being excavated and such material is conducted rearwardly upon such plow blades to the lower face of the throat plate. The upper or superposed conveyer element then comes into play and serves to move the material up the throat plate. It is immaterial whether or not there are excessively large lumps or stones upon the lower face of the throat plate, for the reason that the conveyer mentioned, has a tendency to and is capable of climbing up upon the material and thus compensating for such inequalities. Still further action of the excavating machine moves the dirt or other material up the throat plate and over the end thereof into the trough 35. The two conveyer elements then become complementally effective and positively elevate the dirt the entire length of the trough. It will be understood that the effective operation of the structure outlined may be regulated in a measure by the adjustment of the plow blades either vertically or vertically and angularly or simply angularly. It will also be apparent that the sod cutter and the rooter point may be made more or less effective by the adjustments mentioned.

Should it be desired to lower the plow blades, the hand wheel 30 is operated which lowers the entire box like structure 8 through the medium of the rack 27, pinion 28 and rods 25. Then by turning the handle 24 the forward end of the Y-frame is lowered through the rod 23, rack 20 and pinion 21. By this means any desired angle of the plow blades may be gotten. During the lowering of the box like structure 8, the foot shaft of the upper conveyer is allowed to move freely within this structure since it is in no way connected thereto and swings about the head shaft 42 as a pivot. The foot shaft of the lower conveyer is supported by the structure 8 and consequently follows the movement of this structure during adjustment. The link 46ª carrying its head shaft will then swing about the head shaft 42 to compensate for the difference in elevation of the foot shaft. It is of course apparent that the trough 35 and its supporting frame will also change positions during this operation.

What I claim, is—

1. An excavating machine comprising superposed elevating elements, each of said elements having one end pivotally mounted, said pivotal connections being at opposite ends of said elements, and means whereby one end of one of said elements is movable about the corresponding end of the adjacent elevating element as a center.

2. An excavating machine comprising superposed elevating elements, the upper of said elements having its upper end pivotally supported and its lower end movable about the upper end as a center, the lower of said elements having its lower end pivotally supported and its upper end movably mounted, and means whereby the upper end of the lower elements is movable about the pivoted end of the upper element as a center when the lower end of the lower element is given movement with respect to the excavator.

3. An excavating machine comprising superposed elevating elements, the upper of said elements having its upper end pivotally supported and its lower end movable about the upper end as a center, and a link connection between the upper ends of said elements, the said upper end of the lower element being thereby movable about the upper end of the upper element as a center, the lower end of the lower element being pivotally supported.

4. An excavating machine comprising superposed elevating elements, a confining casing adjacent the lower ends of said elements, the lower end of the lower of said elements being pivotally mounted upon said casing and having its upper end movably supported, the upper end of the upper of said elements being pivotally mounted and having its lower end freely movable within said casing about its upper end as a center, and a throat plate carried by said casing and extending upward between the lower ends of said elements.

5. An excavating machine comprising superposed elevating elements, a confining casing adjacent the lower ends of said elements, the lower end of the lower of said elements being pivotally attached to said casing, the upper end of the upper of said elements being pivotally mounted and having its lower end freely movable within said casing about the upper end as a center, a link connection between the upper end of said upper element and the upper end of said lower element, a trough within which said elements operate, and a throat plate carried by said casing and extending upward between the lower ends of said elements.

6. An excavating machine comprising a trough, a conveyer operating along the base of said trough, a frame for said conveyer pivotally secured at its lower end and movable at its upper end, a complemental superposed conveyer, and a frame for said superposed conveyer pivotally secured at its upper end and having an upward swinging capability at its lower end about the upper end as a center.

In testimony whereof I affix my signature in presence of two witnesses.

PEARL D. CONVERSE.

Witnesses:
WALTER E. S. BOCK,
A. L. PHELPS.

Copies of this patent may be obtained for five cents each, by addressing the "Commissioner of Patents, Washington, D. C."